United States Patent
Wildermuth

Patent Number: 5,128,043
Date of Patent: Jul. 7, 1992

[54] METHOD AND APPARATUS FOR PURIFYING LIQUIDS

[76] Inventor: Glen W. Wildermuth, 472 Tree Top La., Des Peres, Mo. 63122

[21] Appl. No.: 654,738

[22] Filed: Feb. 13, 1991

[51] Int. Cl.⁵ .............................................. C02F 1/48
[52] U.S. Cl. .................................. 210/695; 210/223; 210/243; 210/748; 210/900
[58] Field of Search .............. 210/222, 223, 243, 695, 210/748, 900; 204/186, 299 R, 302

[56] References Cited

U.S. PATENT DOCUMENTS
4,948,514  8/1990  MacGregor et al. .............. 210/748

FOREIGN PATENT DOCUMENTS
| | | | |
|---|---|---|---|
| 2757383 | 6/1978 | Fed. Rep. of Germany | 204/186 |
| 3031673 | 4/1982 | Fed. Rep. of Germany | 210/695 |
| 62-059853 | 3/1987 | Japan | 204/299 R |
| 63-004893 | 1/1988 | Japan | 210/695 |
| 744285 | 6/1980 | U.S.S.R. | 204/299 R |

Primary Examiner—Robert A. Dawson
Assistant Examiner—Matthew O. Savage
Attorney, Agent, or Firm—Polster, Lieder, Woodruff and Lucchesi

[57] ABSTRACT

A method and apparatus for purifying liquids, and more particularly for further purifying ultra-pure liquids such as ultra-pure water utilizing an electric field. It has been discovered that organic and inorganic particles suspended in ultra-pure water will exhibit a net negative charge. This discovery has led to the novel method and apparatus for removing most of these particles by establishing laminar flow of the liquid, passing the liquid through an electric field transverse to the direction of flow to induce mobility of the particles away from a negative field surface, separating the liquid into zones established according to the relative distance from the negative field surface and utilizing the zone of liquid closest to the negative field surface as the liquid with the least particle contamination and thus of greatest purity. The other zones of liquid farther from the negative field surface may be recycled through the system.

24 Claims, 4 Drawing Sheets

METHOD AND APPARATUS FOR PURIFYING LIQUIDS

BACKGROUND OF THE INVENTION

The invention relates to purifying liquids and more particularly to further purifying ultra-pure liquids having a bulk resistivity in excess of one megohm-centimeter. The invention has particular applicability to the removal of particle contamination from ultra-pure water.

Ultra-pure water is generally produced by filtration of city water through a membrane, followed by a series of filtrations through a carbon bed and multiple ion exchange resin beds, with optional steps of ultraviolet sterilization and final membrane filtration through a "polishing" filter.

Ultra-pure water has only trace amounts of ionic, organic, and particle contamination.

By the use of further ion exchange resin beds, the amount of ionic contamination can be reduced to near the theoretical bulk resistivity of approximately 18.3 megohm-centimeters of absolutely pure water.

Particle contamination, including both biological particles (live and dead bacteria and bacterial fragments) and non-biological particles, is more difficult to control. These contaminants have a direct impact on product quality. Membrane filtration technology has some limitations in removing the trace amounts of ionic, organic, and inorganic particle contamination found in ultra-pure water. Membrane filtration systems include membranes having pores for the passage of the ultra-pure water therethrough. These pores are not consistent in size; rather, the pore sizes are distributed around some nominal size. Membrane filters will only remove particles larger than the actual pore size on which they happen to impinge. As a result, the particle concentration and distribution downstream of the membrane filter will reflect the membrane pore size and distribution.

Further, because of the minute size of the pores in a typical filter membrane, the filter produces a sizeable pressure drop on the order of five to twenty psid across the membrane. Often, this pressure drop results in an output stream pressure that is lower than desired for downstream processes.

In addition to drawbacks related to pore size, filter membrane material may deteriorate and shed particles from the physical impact of abrasive particles and chemical attack by the purified liquid. It is particularly difficult for filters to control organic or biological particles because in extended service, bacteria may form significant colonies on the downstream side of the membrane. This can occur by "grow through", fractionating into smaller endotoxins, or even by unnoticed remnant contamination left during membrane installation. Once established on the product side of the membrane, the bacteria colony will multiply and slough off more or less randomly into the product stream further contaminating the ultra-pure liquid. This is true even in the presence of sanitizing agents such as ozone. Moreover, even biological particles that remain on the upstream side of the membrane eventually disassociate or disintegrate, contributing smaller particles that pass through the membrane, as well as releasing organic contamination into the product stream. Finally, membrane filters can be cleaned only with cleaning solutions which are themselves likely to be contaminant-laden or by disassembly and back-flushing or replacement, both of which processes are liable to introduce new contaminants. Thus, it can be appreciated that membrane filtration may actually exacerbate the problem of particle contamination in ultra-pure water.

Ultra-pure water is used in a number of industries, such as the pharmaceutical and electronic industries. In the pharmaceutical industry, biological fragments (endotoxins) can contaminate fluids used for human injection such as water for injection (WFI). If contaminated fluids are injected into patients they may cause adverse physiological reactions. In the electronic device industry, the decreasing feature size of integrated circuits and their increasing overall complexity have made it important to control biological and non-biological particles for several reasons. Particles of one micrometer ($10^{-6}$ meter in SI units) and larger may ruin the circuit element because they alter the intended image in the lithographic reproduction process. They can also damage the costly photomasks used in the process. Furthermore, submicron-size particles can reduce yields if they chemically alter either the silicon near the front surface or the composition of the films being deposited on the silicon wafer.

Standards for ultra-pure water are not entirely consistent. For example, USP standards for water for injection permit, inter alia, 50 colony forming units per ml of bacteria, 0.25 Eu/ml pyrogen, total solids of 10.0 mg/l, and a pH of 5.0 to 7.0. SEMI pure water guidelines for semiconductor processing label as acceptable 0.3 mg/l of total evaporative residue, 0.05 mg/l of total organic carbon, 1000 particulate counts per liter at 100× magnification, 6 live bacteria counts per 100 ml, and a resistivity of 17.9 megohm-cm.

Other examples of applications in which it would be desirable to have ultra-pure water which reliably contains fewer particulate contaminants than presently obtainable are micro-machining tools which rely on high-pressure water jets and the production of electrical capacitors using ultra-pure water as the dielectric medium.

These as well as other high technology industries will have an increasing reliance on the purest possible ultra-pure water in the future.

SUMMARY OF THE INVENTION

One of the objects of this invention is to provide a method and apparatus for further purifying high-resistance liquids, particularly ultra-pure water having a bulk resistivity above one megohm-centimeter, which effectively and consistently reduce particle contaminants.

Another object of this invention is to provide such a method and apparatus which are effective even with source water having very low bacterial, organic, and inorganic contaminant levels.

Another object of this invention is to provide such a method and apparatus which are effective with particles of a wide range of sizes.

Another object of this invention is to provide such a method and apparatus which easily handle large volume flow rates, on the order of gallons per minute, and which produce very little pressure drop.

Another object of this invention is to provide such a method and apparatus which separates its effluent into fractions having greater and lesser degrees of particle contamination, which may provide a recycle stream into a desired part of a water purification system, and which may be operated at clarified product-to-recycle volume ratios of greater than two-to-one.

Another object of this invention is to provide such a method and apparatus which are not adversely affected by ozone, hydrolysis, or sharp-edged foreign matter.

Another object of this invention is to provide such an apparatus which is simple, which does not clog, which requires little maintenance, which can be purged of accumulated debris without disassembly and without the use of contaminant-laden cleaning materials, and which does not provide bacterial colonization sites in contact with the product stream.

Another object of this invention is to provide such an apparatus which is inexpensive to produce, operate, and maintain, and which can be made of readily available materials which have been approved for pharmaceutical and electronic uses.

Another object of this invention is to provide such an apparatus which, because it does not deteriorate and contribute its own particulate contaminants into the product water stream, may be staged in series connection to provide even higher removal rates.

Another object of this invention is to provide such an apparatus which may be configured to fit into standard ultra-pure water system cartridges.

Other objects of this invention will be apparent to those skilled in the art in light of the following description and accompanying drawings.

In accordance with this invention, generally stated, a method and apparatus are provided for further purifying ultra-pure water having a bulk resistivity in excess of one megohm-centimeter, the water containing trace amounts of organic and/or inorganic particles, by establishing laminar flow of the water and passing the water through an electromagnetic field transverse to the direction of flow of water to induce mobility of the particles in a desired and predictable direction transverse to the direction of flow. The method is readily adaptable to flow rates from 0.2 to 200 gallons per minute. As used herein, the term "electromagnetic field" includes such fields in which one of the electric field and the magnetic field is zero, for example a field produced by electrostatic charge or by permanent magnets. It has been discovered that organic and inorganic particles suspended in ultra-pure water will exhibit a net negative charge as will be discussed in detail hereinbelow.

In the preferred embodiment, the electromagnetic field is an electrical field established in a cylindrical chamber by a medium voltage (less than about 5,000 volts) D.C. potential, between a central, axially extending electrode and the wall of the cylinder. Laminarly flowing water is brought into one axial end of the cylinder through inlets which are sized, shaped, and proportioned to produce laminar flow a short distance from the entrance to the cylinder. The conditions for laminar flow are well-known, requiring a Reynolds number below four thousand, preferably below two thousand. Within the cylinder, the liquid is separated into liquid zones established according to the relative distance from the cathode, and the zone closest to the cathode is utilized as the liquid with the least particle contamination. Preferably baffles are provided at the outlet end of the cylinder to separate the zones and prevent turbulent flow at the outlet end of the cylinder from remixing particles from the more contaminated zones to the less contaminated zones. The method of the invention is accomplished in part by the fact that ultra-pure water provides high resistivity greater than one megohm-centimeter.

The method and apparatus of the instant invention operate pursuant to the discovery that organic and inorganic particles suspended in ultra-pure water exhibit a net negative charge or polarity The origins of these negative charges are different with respect to organic and inorganic particles With regard to organic or biological particles which are comprised of organic molecules, the principal functional groups on these organic molecules are carboxyl and phosphate. Typically, these negatively charged functional groups collect positive ions from normal water to form a "counter-ion layer". These counter-ions surround the particle and may give the particle a net positive charge known as "Zeta Potential". However, not previously recognized in the art is the fact that ultra-pure water which is demineralized allows the biological particles to acquire only a very weak counter-ion layer. As a result, biological particles will exhibit their original functional group net negative charge. This net negative charge enables an applied electric and/or magnetic field to move the particle in a predictable direction.

Non-biological particles in ultra-pure water systems generally originate from the system piping and gasket materials In the electronics industry, the piping materials usually are chlorinated and fluorinated hydrocarbons. In the pharmaceutical industry, the piping is usually stainless steel. These particles do not have active functional groups, i.e., they will not react with anionic or cationic stains. However, these generally non-polar molecules will collect residual negative charges from the surrounding water because of the natural hydrophobicity of negative charges in water. As a result, non-organic particles also develop a net negative charge which permits electric and/or magnetic fields to move them in a predictable direction.

The discovery that organic and inorganic particles suspended in ultra-pure water inherently exhibit a net negative charge has led to the novel method and apparatus of the present invention wherein particles, both organic and inorganic, can be removed from ultra-pure water with the imposition of an electromagnetic field such as a D.C. electric field or a magnetic field.

Because organic and inorganic particles suspended in ultra-pure water exhibit a net negative charge, the particles will migrate away from the negatively charged cathode and the zone of fluid flow closest to the cathode will be the portion of the fluid which has been purified to the greatest extent. This portion of the fluid will be utilized and the other more contaminated portions will be recycled or discarded.

Briefly stated, the preferred apparatus according to the principles of the present invention for purifying a liquid containing organic and/or inorganic particles comprises a generally cylindrical elongated chamber having a liquid inlet end and a liquid outlet end. The apparatus preferably includes a plurality of inlets in one end wall of the cylindrical chamber and a plurality of outlets in the opposite end wall. The liquid inlets and liquid outlets are sized, configured, and positioned so as to produce generally laminar flow through the cylindrical chamber. An elongate rod is axially disposed within the chamber and electrically insulated therefrom. A D.C. electric potential is provided between the side wall of the chamber and the rod such that one of the chamber wall or the rod acts as a cathode and the other acts as an anode whereby the cathode maintains a relative negative charge with respect to the anode. At least one annular baffle is positioned coaxially around the rod proximate the outlet end only and in liquid-tight relation with the outlet end of the chamber to delineate coaxial zones of fluid flow. Preferably, the baffles and the end walls are made of dielectric materials. As fluid flows longitudinally through the chamber, the electric field maintained transverse to the direction of fluid flow will produce a migration of the net negatively charged organic and inorganic particles away from the cathode to provide a zone of further purified liquid proximate the cathode This liquid, being separated from the zone farthest from the cathode by the annular baffle, will be separated and independently recovered from the chamber and utilized as the further purified liquid.

The apparatus will generally be the final stage of a multistage purification system including deionizers and filters upstream of the apparatus. It is contemplated that the liquid which is contaminated by particulate matter to a greater extent, in the zone farthest from the cathode, will be recycled through some part of the system to further purify this zone of liquid or discarded if desired.

It is further contemplated that more than one annular baffle of differing diameter and positioned coaxially, may be provided in the chamber to provide a plurality of zones such that different concentrations, or even different types, of particulate contaminants will be present in the zones according to the relative distance thereof from the cathode; therefore, it is contemplated that the zone farthest from the cathode may be discarded and the zones nearer the cathode may be recycled through the system to further purify the liquid in those zones, or water in different zones may be recycled to different stages of the system. Alternatively, each zone may be intermittently or continuously sampled, and the effluent from each zone used, recycled, or discarded in accordance with tests made on the samples.

The inlets to the chamber and outlets from the chamber are sized, positioned, and configured in concert with the dimensions of the chamber to produce a negligible pressure drop between the inlet and outlet sides of the chamber as well as laminar flow through the chamber.

In other embodiments, the electromagnetic force is primarily magnetic. Magnetic forces require relative movement of the particles with respect to the magnetic field in order to provide migration of the particles orthogonal to the direction of flow. In order to maintain laminar flow and high throughput, the magnetic field is moved rapidly either electronically or physically along the conduit In one embodiment, the conduit is linear and electromagnets along it are energized in sequence to form a rapidly traveling magnetic field along the conduit. In another embodiment, the conduit is generally circular and permanent magnets are rotated over the conduit.

BRIEF DESCRIPTION OF THE DRAWINGS

FIG. 7 is a sectional view, partially cut away of another embodiment of device of the present invention, modified to fit a standard ten-inch filter housing.

FIG. 7A is a somewhat diagrammatic view of an endcap portion of the device of FIG. 7, the line 7—7 showing the section on which FIG. 7 is taken.

DETAILED DESCRIPTION OF THE PREFERRED EMBODIMENT

Figures 1, 5, 6:
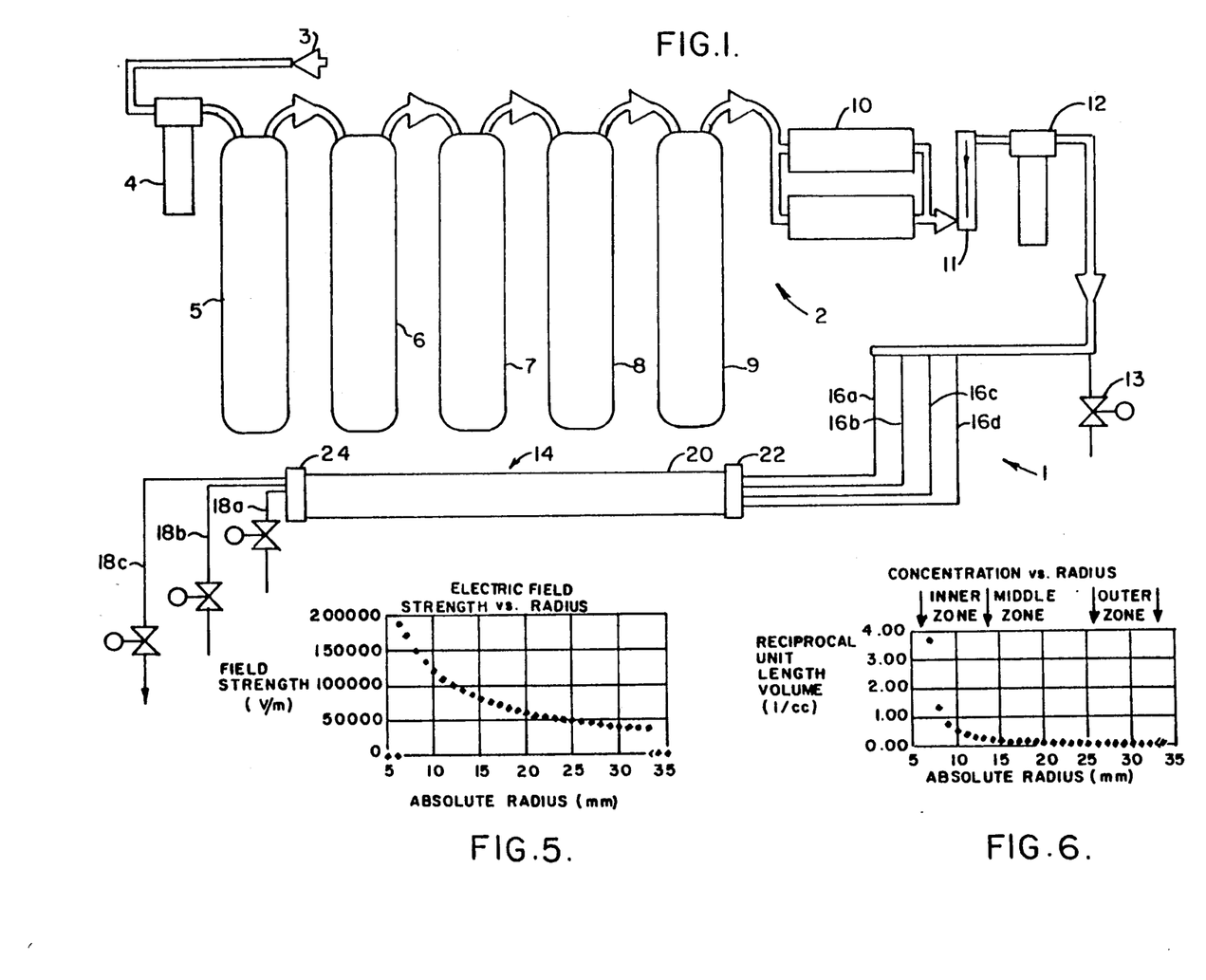
FIG. 1 is a schematic diagram of a water filtration system for producing ultra-pure water, the system incorporating a process chamber in accordance with the principles of the present invention.
FIG. 5 is a graph showing the relationship between the electric field strength and the radius of the process chamber of FIGS. 1–4.
FIG. 6 is a graph showing the calculated relationship between particle concentration and radial position of the process chamber of FIGS. 1–4.

Referring now to the drawings, and in particular to FIG. 1, reference numeral 1 indicates an ultra-pure water system of the present invention. The system 1 includes a conventional ultra-pure deionized water system 2 to which is added, as its final stage, a unit process chamber 14 which is constructed and adapted to operate according to the principles of the present invention.

Ultra-pure water production system 2 includes water inlet 3 providing ordinary city water to system 1. The water passes through an initial membrane filter 4 to remove particulates. The water is then successively passed through a carbon bed 5 to remove organics, a cation bed 6, an anion bed 7, and a plurality of mixed cationic and anionic beds indicated at 8 and 9 to remove ions from the water. The water may optionally then be passed through a plurality of parallel connected ultraviolet sterilizers 10, thence through rotameter 11 to measure flow rate, and thence through membrane final filter 12. The final filter 12 typically is of finer porosity than the roughing filter 4, for example a 0.2 micron filter as compared with a 10.0 micron roughing filter 4.

At this point the water is for purposes of this disclosure referred to as "ultra-pure" and a sample of such ultra-pure water may be obtained through valve 13 to determine the purity or particulate content of the ultra-pure water. It is noted that the water has now been deionized such that the resistivity thereof is greater than one megohm-centimeter. The resistivity of water at the sample valve 13 is typically from 4.0 to 18.0 megohm-centimeters, although it may vary from time to time, and the system is generally programmed to shut down when resistivity falls below 1.0 megohm-centimeter. Total numbers of colony forming bacteria per ml may vary from a few to several hundred per ml, and the numbers of live and dead bacteria, pyrogens, and other particulates may change unpredictably.

In order to further purify the ultra-pure water, it is necessary to remove organic and/or inorganic particulate matter which may have escaped the conventional purification process or which may have been introduced into the ultra-pure water somewhere along the ultra-pure process system.

The conventionally purified water is conveyed through pipes 16a, 16b, 16c and 16d into unit process chamber 14 for purification in accordance with the principles of the present invention. As will be discussed in detail hereinafter, water flows into and through the chamber 14 in a substantially laminar manner. Water flowing through unit process chamber 14 will be separated into zones of fluid flow and removed from the chamber. According to a preferred embodiment of the invention, exit flow is removed in three different zones: by pipe 18a which removes the inner zone fluid, pipe 18b which removes the middle zone fluid, and pipe 18c which removes the outer zone of fluid flow from unit process chamber 14.

Figure 2:
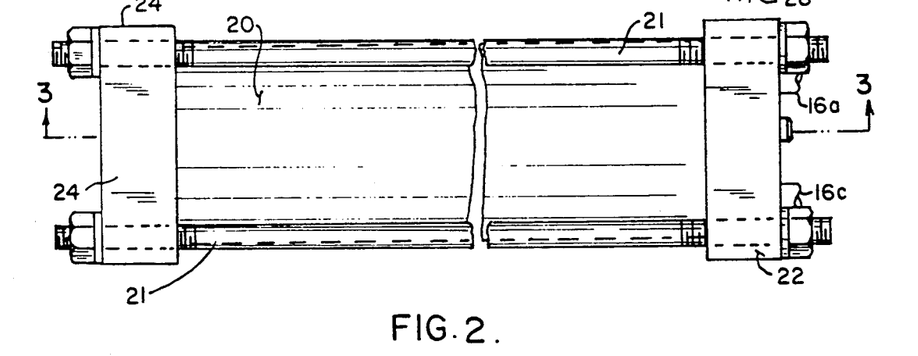
FIG. 2 is a view in side elevation of the process chamber portion of the system of FIG. 1.
Figure 3:
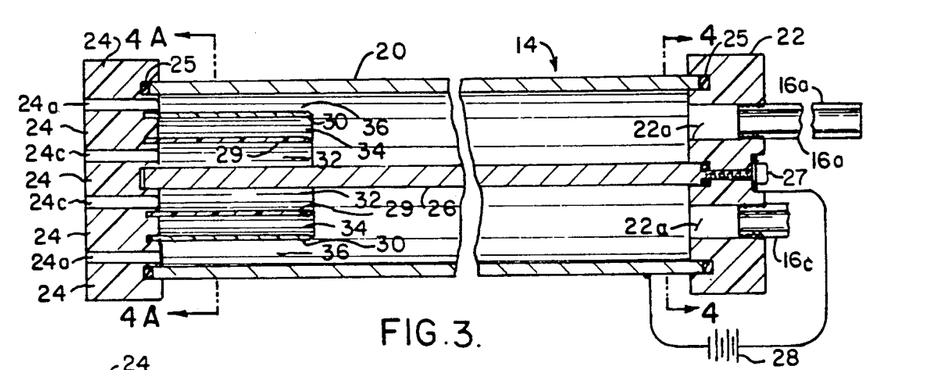
FIG. 3 is a sectional view, taken along the line 3—3 of FIG. 2.
Figure 4:
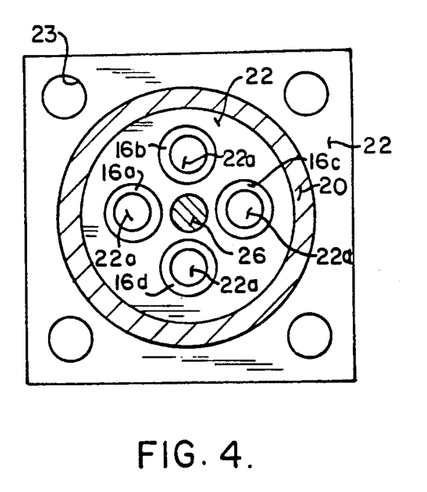
FIG. 4 is a sectional view taken along the line 4—4 of FIG. 3, showing an inlet end of the process chamber of FIGS. 2 and 3.

With reference to FIGS. 2-4 in particular, process chamber 14 is shown as a generally cylindrical chamber which may be easily fabricated from readily available, inexpensive fluid processing materials. Chamber 14 is comprised of an electrically conductive cylindrical and elongated wall 20 having at its axial ends dielectric inlet endcap 22 and dielectric outlet endcap 24 positioned in liquid tight relationship with cylindrical wall 20. The endcaps 22 and 24 are held by threaded rods 21 extending through holes 23 in the corners of the the endcaps 22 and 24. Gaskets 25 provide a seal at each axial end of the tubular wall 20. An electrically conductive elongated rod 26 is centrally and axially positioned within chamber 14 and extends the entire length of the chamber. The rod 26 is carried by the endcaps 22 and 24 and is electrically insulated from wall 20. One end of the rod 26 is internally threaded. It extends through the inlet endcap 22 and is held to the inlet endcap 22 by a cap screw 27. Leakage is prevented by an O-ring seal. The other end of the rod 26 extends into a bore in the outlet endcap 24; the bore is slightly deeper than required by the length of the rod 26, to enable the rod to float axially and accommodate differential expansion of the rod 26 and the wall 20. A medium voltage D.C. power supply 28 is connected between wall 20 and rod 26 to thereby set up an electrical field between rod 26 and wall 20. The electric potential is preferably on the order of two kilovolts. Because of the relative positioning of rod 26 and coaxial cylindrical wall 20, the field established by the power supply extends laterally of fluid flow through chamber 14 as will be discussed in greater detail hereinafter. Chamber wall 20 and rod 26 are preferably of an electrically conductive material such as stainless steel in direct contact with the liquid flow; however, the same principles would apply to a system in which the wall and rod were covered by electrical insulation, provided the same electric field resulted through the liquid flow.

Figure 4A:
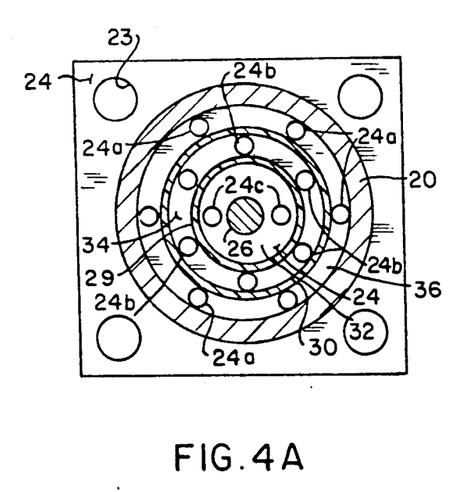
FIG. 4A is a sectional view taken along the line 4A—4A of FIG. 3, showing an outlet end of the process chamber of FIGS. 2 and 3.
Figures 7, 7A:
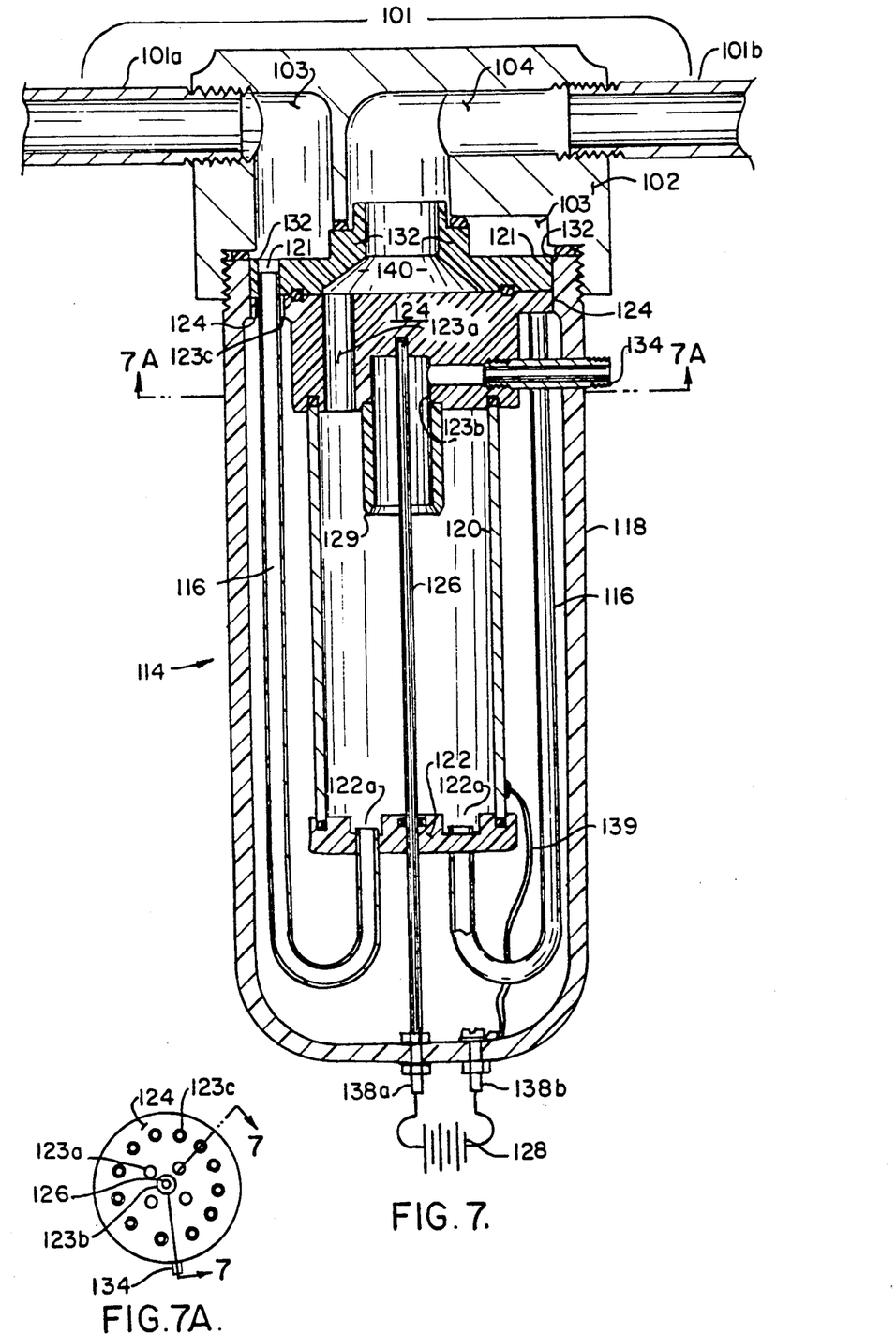

Fixed to the interior surface of exit endcap 24 are two annular baffles 29 and 30 which are of differing diameter and situated in chamber 14 coaxially around rod 26 proximate the outlet end of the chamber only. It can thus be seen that baffles 29 and 30 in cooperation with chamber wall 20 and rod 26 create three separated zones of liquid flow, i.e., an inner zone between baffle 29, and rod 26, a middle zone between baffle 29 and baffle 30, and an outer zone between baffle 30 and wall 20 of chamber 14.

Inlet endcap 22 is provided with a plurality of inlet openings 22a which permit liquid flow from pipes 16a, 16b, 16c and 16d to enter chamber 14. Outlet endcap 24 is provided with a greater number of smaller openings. Outlets 24a are equally, circumferentially spaced around endcap 24 and positioned between baffle 30 and outer wall 20 to provide exit passage of the outer zone of fluid flow. Outlets 24b are equally, circumferentially spaced around endcap 24 between baffle 29 and baffle 30 in order to provide an exit path for the middle zone of liquid flow, and outlets 24c are equally circumferentially spaced around endcap 24 between baffle 29 and rod 26 to form an exit passage for the inner zone of fluid flowing through chamber 14. It is noted that the inlet passageways 22a, the chamber 14, and the outlet passageways 24a, 24b and 24c are sized such that negligible pressure drop is produced across unit process chamber 14.

Further, the inlets 22a, the chamber 14, and outlets 24a, 24b and 24c are configured and situated so as to produce laminar flow (i.e., non-turbulent flow) through the unit process chamber 14.

According to the principles of the invention, ultra-pure water is introduced into process chamber 14 through inlets 22a. The ultra-pure water flows through chamber 14 in laminar fashion and exits through outlet ports 24a, 24b, and 24c. If for example, rod 26 is selected to be the anode and thus is positively charged with respect to cathode wall 20, as water flows through process chamber 14, organic and inorganic particles suspended in the ultra-pure water (which have been discovered to exhibit net negative charge in ultra-pure water) will be repelled from the cathode wall 20 and attracted to the anode rod 26 thereby creating an outer zone of further purified ultra-pure water which will be confined between baffle 30 and wall 20 and captured through exit ports 24a. Liquid flowing into the middle zone created between baffle 29 and baffle 30 and exiting ports 24b will exhibit somewhat lesser purification than the outer zone, and the inner zone created between rod 26 and baffle 29 will exhibit a zone of fluid exiting ports 24c which will be of substantially less purity than that of the outer zone. It is thus contemplated that the further purified liquid of the outer zone exiting ports 24a will be utilized in the particular industrial process whereas the middle zone liquid and inner zone liquid will be either recycled for further purification or discarded. If desired, the inner zone effluent may be recycled to a point farther upstream in the system than the middle zone effluent.

In order to demonstrate the unit process, ultra-pure water was produced for use as supply water to the process chamber 14. This ultra-pure water was produced by first filtering city water through a 0.1 micrometer Cuno Zetapore filter 4. The water was then passed through a series of 9" service deionizing (D.I.) bottles:

| Bottle 5 (Activated Carbon) | |
|---|---|
| Manufacturer | American Norit, Inc. |
| Product Designation | Darco 12 × 40 mesh |
| Quantity | 1.0 ft.$^3$ |
| Bottle 6 (Cationic Resin) | |
| Manufacturer | Sybron Corporation |
| Product Designation | Ionac C-249 (0.4–1.2 mm) |
| Quantity | 1.5 ft.$^3$ |
| Bottle 7 (Anionic Resin) | |
| Manufacturer | Sybron Corporation |
| Product Designation | Ionac ASB-2 (0.35–0.55 mm) |
| Quantity | 1.5 ft.$^3$ |
| Bottles 8 and 9 (Anionic and Cationic Resin "Mixed Bed") | |
| Manufacturer | Sybron Corporation |
| Product Designation | Ionac ASB-2 (0.35–0.55 mm) |

| | |
|---|---|
| Quantity (anionic) and | 0.9 ft.$^3$ |
| Product Designation | Ionac C-249 (0.4–1.2 mm) |
| Quantity (cationic) | 0.43 ft.$^3$ |

This arrangement of organic absorption and demineralization bottles produced high resistivity water of sixteen megohm-centimeters. The water was then passed through two ultraviolet sterilizers 10 (Aquafine Model SP-1) connected in parallel. Next, the water passed through a rotameter 11 to measure flow rate, followed by a final 0.1 micrometer Cuno Zetapore membrane filter 12. A sampling valve 13 was installed at the end of the pretreatment system in order to monitor retreatment water quality (i.e., the supply to the unit process The pretreatment system produced ultra-pure water with the following specifications:

Organics: less than 50 micrograms/L of Total Organic Carbon (as measured by an Anatel A-100 TOC Analyzer);

Bulk Resistivity (inversely proportional to ion content): greater than 16 Mohm-cm (as measured by an Anatel A-100 TOC analyzer, set on PURGE cycle);

Particles: less than 20 particles/ml greater than 0.2 micrometer (as measured by the Nomura 2000× Optical Microscope Particle Counting Technique);

Bacteria: less than 150 Colony-Forming Units/100 ml (as measured by Total Count Bacteria per Millipore Field Monitor Sampling Procedure)

The pretreatment water entered a process chamber 14 comprised of a 2½" NPT nominal diameter, 6' long, 316 alloy stainless steel pipe via four ½" polyvinyl chloride (PVC) pipes 16a–16d. The pipes 16a–16d were straight for a distance of at least five inches ahead of the inlets 22a–22d to ensure laminar flow into the chamber 14. The four pipes 16a–16d together delivered a total of two gallons per minute of water essentially equally over the cross-sectional area at the supply end of the chamber. Two gpm was selected as the maximum flowrate at which laminar flow could exist within the process chamber. Unlike most high-purity fluid systems, lack of turbulent flow (thus, laminar flow) in the chamber is desirable in the process chamber 14. A ½" diameter, 316 alloy stainless steel rod 26 ran the length of the chamber 14 down the center, and was suspended between the 1" thick PVC end plates 22 and 24.

At the product (outflow) end, the process chamber was divided into three annular, concentric separation zones by two cylindrical baffles 29 and 30 of differing diameter an inner zone 32 nearest the rod 26, a middle zone 34, and an outer zone 36.

The cylindrical baffles were made by extending the cylinders perpendicularly from the product end plate to a distance 6" upstream inside the chamber. The inner baffle 29 had an inner diameter of 0.957" and an outer diameter of 1.207". The outer baffle 30 had an inner diameter of 1.939" and an outer diameter of 2.189". The pipe 20 had an inner diameter of 2.635" and an outer diameter of 2.875". Thus, the inner zone 32 had a cross-sectional area of 0.523 in$^2$, the middle zone 34 had a cross-sectional area of 1.809 in$^2$, and the outer zone 36 had a cross-sectional area of 1.690 in$^2$.

In the central part of each separation zone, 0.040" diameter orifices 24a, 24b, and 24c were drilled into the exit end plate 24 to allow the processed water and its constituents to exit the unit process chamber. The size of the orifices was chosen for testing to artificially produce a pressure drop which in a commercial embodiment would be produced by point-of-use equipment. To maintain uniform flow characteristics, the number of orifices in each separation zone was kept proportional to the cross-sectional area of the zone. Inner zone 32 had two orifices, middle zone 34 had six orifices, and outer zone 36 had six orifices.

The exit side of one orifice from each zone was drilled and tapped to accept a sampling valve to permit evaluation of water quality differences between separation zones. This was done in such a way as to not introduce significant flow irregularities in the zones.

In a commercial implementation of this invention, it is contemplated that a manifolding arrangement would be used on the product end of the unit process chamber to permit separate routing of the desired and undesired product streams. Outlet orifice size will be chosen to permit flow rates of at least 0.2 gpm, preferably from about one gpm to about two-hundred gpm. In general, the process chamber 14 will not limit flow, and flow rates will be determined by point-of-use equipment in a closed system.

While water passed laminarly through the unit process chamber, a 2000 v DC potential was placed across the chamber wall and rod (the rod was the anode, i.e., was positive with respect to the chamber wall). This potential was generated by a medium voltage power supply which was comprised of a variable autotransformer supplied with standard 120 v AC 60 Hz power to permit adjusting the output voltage to the desired level. An ammeter monitored the current from the autotransformer to a plurality of primaries as a precaution against overloading. A plurality of dry-type filament transformers, wired in such a manner that the secondary winding voltages add algebraically, provided the voltage boost to 2000 volts.

This stepped-up AC voltage was fed to a bridge circuit for full wave rectification. A milliammeter indicated the DC output current, and a voltmeter indicated the output voltage. Standard D'Arsonval DC meters were used with appropriate correction factors applied for determining the true RMS value of the output. Output power from this supply was observed in excess of 100 Watts.

The chamber electrodes rod and wall were attached directly to the output of the power supply. Power consumed by the chamber is dependent on the resistivity of the fluid, since the effective load resistance of the chamber fluid is directly proportional to its bulk resistivity. While for unattended operation an output voltage regulator could be added, experience showed the manual adjustment satisfactorily stable, provided water resistivity did not change significantly.

In the example, the 2000 v potential transported most of the biological and non-biological particles away from the negatively charged process chamber wall and toward the positively charged central rod. The phenomenon of electrically-induced mobility of the biological and non-biological particles is the result of their net negative charge when suspended in ultra-pure water as explained hereinabove.

Although the theory of operation of the device 14 is no per se a part of the invention, it is helpful in understanding the invention.

Electric field lines at any cross-section of the chamber (away from the ends) are coplanar, having only radial components. Near the ends, the lines would bow away from the tube in the longitudinal direction and then reconverge on the rod, maintaining radial symmetry.

Hydrodynamic forces are the forces that tend to move the charged particles in the direction of fluid flow in the chamber. For a given chamber length, the electric field (or E-Field) strength must be strong enough that the charged particles will be moved toward either electrode before the hydrodynamic forces flush them into the baffled separation area at the end of the chamber.

E-Field forces move the charged particles radially in the chamber, providing the positioning required for separation near the exit end of the chamber.

The basic physical equation of the positioning force is:

F=qE where: where:
F is the vector quantity of force in mks units;
E is the vector quantity of E-field strength;
q is net charge on the charged particle seen by the E-field. In short, this relationship states that the magnitude of the force on any charged particle is a product of its net charge and E-field strength. Its direction is parallel to the E-field direction at that location in the chamber, and the product sign will be negative if the force acts opposite the direction of the E-field (i.e., if the net charge is negative).

The E-field equation for the chamber away from either end will be recognized as the E-field for a cylindrical coaxial capacitor, given in many undergraduate electromagnetic fields texts (for example, Johnk, *Engineering Electromagnetic Fields and Waves*, Wiley, 1975, pp. 214-215):

$E = (V/[r*\ln(b/a)])a_r$ (for r between a and b) where:
V is the potential difference (voltage) between the electrodes
r is the distance (the independent variable) measured in meters from the center of the cylinder
b is the value of r at the inside wall of the chamber shell
a is the value of r at the outer diameter of the central rod, and
$a_r$ is the unit vector showing field direction.

This equation applies only to the fluid volume inside the chamber, as no E-fields can exist inside the central rod or outside the coaxial capacitor-like chamber by Gauss' Law.

The equation states that E-field forces on charged particles (1) have only radial components, (2) are directly proportional to applied voltage, and (3) are inversely proportional to radial distance from center by a constant determined by radial chamber dimensions.

FIG. 5 shows the magnitude of field strength as a function of radial distance from the center of the chamber. It may be noted that the field magnitude is zero both inside the center electrode and beyond the inner diameter of the outer shell. The nonlinear increase in E-field strength near the inner electrode is novel to the chamber design and makes a significant contribution to the separation efficiency of the chamber design. This will be discussed in more detail below.

Since the chamber is not of infinite length, some fringing will occur at the ends. This does not negatively impact the operation of the device; at the entry end, no separation has yet occurred, and at the exit end, the baffles maintain the separation achieved several inches upstream of the exit. Finally, fringed E-field lines would still apply force to the charged particles in such a way that they would arrive at the intended destination, albeit by paths bowed in the longitudinal direction.

Other forces are present in the chamber, but their magnitude relative to the E-field hydrodynamic forces are so small that they can be ignored in the chamber analysis.

Gravitational and buoyant forces can be dismissed because the charged particles, predominantly bacteria, are almost entirely made up of water. Therefore, there is little difference in density to give rise to buoyant or gravitational forces.

Magnetic field forces are present due to the current flowing in the electrodes and the fluid. However, the magnetic fields set up by the current through the fluid are vectorially self-cancelling, and the worst case magnitudes of the forces set up by electrode current magnetic fields are about $10^{-8}$ less than those due to the E-field.

The cylindrical geometry of the chamber enhances separation efficiency over rectangular and other cross-sections. This is due to inherent advantages in the E-field and volumetric geometries used in this application. This is discussed in greater detail below.

The electrical field magnitude increases non-linearly, rising at an ever-increasing rate when moving from the outer (shell) electrode of the chamber to the inner (rod) electrode (see FIG. 5).

By definition, volumetric concentration (e.g., particles/liter), has the volume term in the denominator. Therefore, when moving from the outer electrode to the inner electrode, the effective concentration per longitudinal axis unit length increases at an increasing rate. (See FIG. 6 for a plot of reciprocal volume per unit length versus radius.) To be exact, the volume per unit length of the chamber is derived from the equation for the difference in volumes of right circular cylinders of length L and radii r and $r_a$:

$$Vol = L \times \pi \times (r^2 - r_a^2)$$

or by manipulation
$Vol/L = \pi \times (r^2 - r_a^2)$ (where $r_a$ is less than r)

This equation states that the volume per unit length of the chamber at a particular distance from the outer surface of the rod is proportional to the difference between the squares of the radial distances outward from the rod and the rod radius. This means that as a charged particle moves closer to the inner electrode, the concentration (i.e., quantity per unit volume) increases by the inverse of the difference between these squares.

The outer and middle chambers are both volumetrically over three times larger than the inner chamber. If the supply has a spatially homogeneous volumetric particle distribution, then as charged particles move radially into the inner part of the chamber, the volumetric concentration effectively increases by a factor of 3.3 times due to the volume change alone.

The treatment system and unit process prototype described previously were operated with the following operational parameters;

| Process Flowrate: | 1.9 gpm |
|---|---|
| Electric Field Potential: | Rod 2000 v DC more positive than pipe |
| Primary Supply Current: | 1.8 AC @ 120 V, 60 Hz |
| Interelectrode Current: | 46 mA DC |

Table 1 below shows the particle volumetric concentration data for the example system.

TABLE 1

| SAMPLE LOCATION | PARTICLE CONCENTRATION (No./ml) | | |
|---|---|---|---|
| | NON-BIOLOGICAL | BIOLOGICAL | TOTAL |
| SUPPLY | 16 | 4.1 | 20 |
| PRODUCT | | | |
| Inner | 8.9 | 5.1 | 14 |
| Middle | 5.4 | 1.9 | 7.3 |
| Outer | 5.5 | 0.75 | 6.3 |

The data above indicate that the unit process decreased the incoming biological particle concentration by 82% and non-biological particles by 66% in the outer (purified) product zone.

Figure 8:
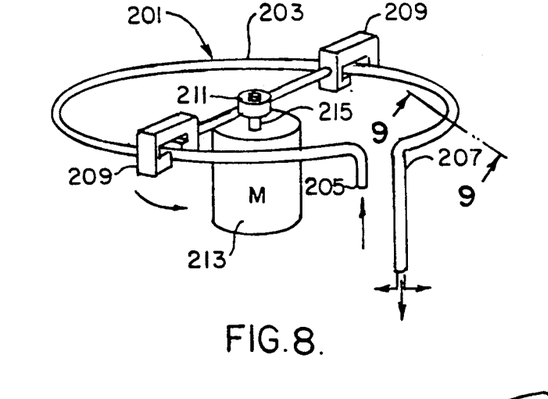
FIG. 8 is a somewhat diagrammatic view in perspective of another embodiment of device of the present invention, utilizing a magnetic field.
Figure 9:
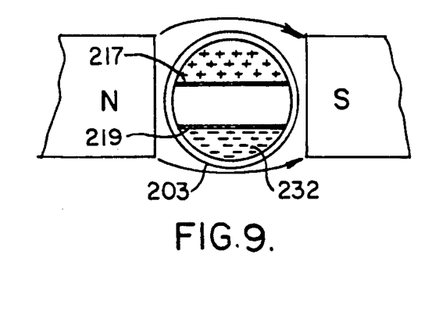
FIG. 9 is a view in section, taken along the line 9—9 of FIG. 8.
Figure 10:
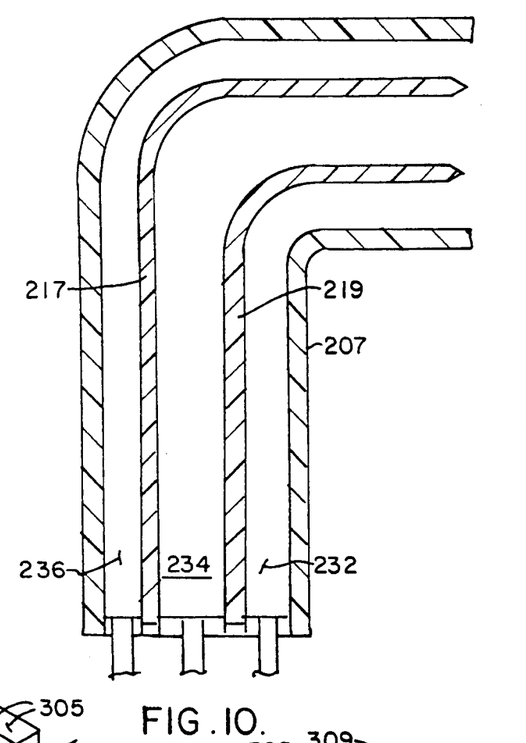
FIG. 10 is a view in section of an outlet portion of the device of FIG. 8.

To verify the theory of charged particle mobility, the polarity of the applied voltage was reversed, causing the force exerted by the electric field to reverse direction Theory predicts that the inner zone would become the more purified zone (albeit with reduced efficacy, due to less suitable field and volumetric geometries). In this configuration, the biological and non-biological particles traveled toward the chamber outer zone, purifying the inner zone (i.e., verifying the theory).

This time, the treatment system and unit process prototype described in previous sections were operated with the following operational parameters:

| | |
|---|---|
| Process Flowrate | 1.9 gpm |
| Electrical Field Potential: | Rod 2000 v DC more negative than pipe |
| Primary Supply Current: | Not recorded; believed = same as before |
| Interelectrode Current: | 44 mA DC |

Table 2 below shows the particle volumetric concentration data for the modified example system.

TABLE 2

| SAMPLE LOCATION | PARTICLE CONCENTRATION NON-BIOLOGICAL | BIOLOGICAL | (No./ml) TOTAL |
|---|---|---|---|
| SUPPLY | 8.3 | 1.5 | 10 |
| PRODUCT | | | |
| Inner | 1.9 | 0.33 | 2.3 |
| Middle | 6.8 | 1.4 | 8.1 |
| Outer | 8.9 | 0.34 | 9.3 |

The data above indicate that the unit process decreased the incoming biological particle concentration by 78% and the non-biological particle concentration by 77% in the inner (purified) product zone. Although the overall reduction in particle concentration in the inner zone is greater than the reduction in the outer zone of the preferred polarity, the volume of purified water is less than a third of the volume produced by the preferred polarity.

It can thus be seen that the method and apparatus performed and operated according to the principles of the present invention as hereinabove described and attained the benefits and fulfilled the objects and advantages stated hereinabove.

Other embodiments of the invention may also be produced, although they lack some of the simplicity of the preferred embodiment.

By way of example, the device of the first embodiment may be reduced in size and modified to fit into a standard ten-inch filter housing of a standard ultra-pure water system. Such a modification is shown in FIGS. 7 and 7A.

The embodiment of FIG. 7 may include all of the conventional deionized water components of FIG. 1, except the polishing filter 12, which is replaced by a liquid purifying device 114 in accordance with the present invention. The purifying device 114 is similar to the process chamber 14, but is modified to fit into the standard piping 101 and internally threaded housing 102 of the filter 12. The housing 102 includes an inlet passage 103 connected to an inlet pipe 101*a* and an outlet passage 104 connected to an outlet pipe 101*b*. The purifying device 114 includes an outer casing 118 having a threaded upper periphery for screwing the device 114 into the housing 102. The outer casing 118 is under twelve inches long, in order to fit in any installation set up for a standard ten-inch cartridge. An adapter block 132 at the upper end of the casing 118 includes connections for inlets and an outlet to a cylindrical tube 120 corresponding to the tube 20 of the firs embodiment as described more fully hereinafter The tube 120 is of the same diameter and material as the tube 20, but is about eight inches long. Plastic end caps 122 and 124 support between them a central rod 126 corresponding to the rod 26. The rod 126 and the inside surface of the tube 120 are covered with a thin coating of polytetrafluoroethylene to prevent introduction of metal ions into the purifying device 114.

The adapter block 132 includes, extending through its lower face, twelve peripheral openings 121 in fluid communication with the inlet pipe 101*a* and a manifold outlet 140 in fluid communication with the outlet pipe 101*b* leading to the process using the ultra-pure water.

The end cap 124 has twelve larger matching holes 123c for the twelve peripheral openings 121 in adapter block 132 for the purpose of allowing inlet pipes 116 to pass through the endcap 124 without interference. The holes 123*c* are radially outside the tube 120. The end cap 124 also has four outer outlets 123*a* communicating between the radially outer portion of the interior of tube 120 and the manifold 140. The end cap 124 also has a central outlet opening 123*b* in fluid communication with a radially extending recycle outlet 134.

The casing 118 also includes two electrical connectors 138*a* and 138*b* for connecting the rod 126 and the tube 120 to a source of electric potential 128. The connector 138*a* is the threaded end of the rod 126. A wire 139 electrically joins connector 138*b* to tube 120.

The peripheral openings 121 in the adapter block 132 carry inlet pipes 116 which extend axially down the tube 120, between the tube 120 and the outer casing 118. The inlet pipes 16 extend below the lower end of the tube 120, then curve gently upward a distance of five to ten times their inner diameter, to insure laminar flow of the water they carry as the water enters the tube 120 through twelve openings 122*a* in the inlet end cap 122. To increase separation, the voltage applied between the rod 126 and the tube 120 by the DC voltage source of this embodiment is 4,000 volts. A single baffle 129 extends two inches into the tube 120 from the outlet end cap 124, separating the recycle outlet opening 123*b* from the product outlet openings 123*a*.

The operation of the embodiment of FIG. 7 is the same as the operation of the first embodiment, the PTFE coating having little or no effect on the operation of the device. Because bacteria and other particles are drawn toward the rod 126 but are not collected on it, contamination of the system is not a problem. Moreover, any bacterial colonies which might form on the rod would be swept into the recycle stream when they broke loose. If desired, polarity of the system may be reversed periodically while ultrapure water is passing through the system, to further clean contaminants from the rod and from the baffles A magnetic version of the device of the present invention is shown in FIGS. 8-10. The device 201 is also intended for use as the last stage of an ultra-pure water system. The device includes a one-inch diameter tube 203, made of a non-ferromagnetic material and bent to form a horizontal circle of two-foot radius, with an inlet 205 and an outlet 207. Two high field strength permanent ceramic magnets 209 are mounted on the ends of a rotor 211, driven by an electric motor 213 having a vertical shaft 215. The magnets are C-shaped, with the arms of the magnet embracing the tube 203. The north pole of each magnet is inside the tube 203 and the south pole outside it. Ultra-pure water enters inlet 205 flowing in a laminar manner. The rate of flow of the water is maintained at or below the maximum value permitting laminar flow through the tube 203. The rotor 211 rotates in a direction opposite the direction of flow, to produce the maximum force on charged particles in the flowing water, in a direction perpendicular to the direction of flow. Positive ions migrate up and negatively charged particles migrate down. In the circular portion of the tube 203, adjacent the outlet 207, two horizontal separator plates 217 and 219 perform the function of the concentric baffles 29 and 30 of the first embodiment. As shown in FIG. 10, the separator plates extend into the outlet 207 of the tube 203 and divide the outlet 207 into a product chamber 236, a recycle chamber 234, and a disposal chamber 232, each connected to appropriate piping The separator plates 217 and 219 extend into the circular portion of the tube 203 sufficiently to ensure laminar flow of the water in the tube 203 at the point of separation into chambers 232, 234, and 236. Further purified water for use is taken from the upper chamber or chambers, while water from the lower chamber or chambers is recycled or thrown away.

The vertical force felt by a charged particle moving at right angles relative to a magnetic field is determined by the charge q on the particle, the magnetic field strength B and the relative velocity v of charge and field:

$$F = q \times (V \times B)$$

To generate adequate force to provide separation of negatively charged particles in the tube 203, the magnets produce a magnetic field of at least 1,000 Gauss and are rotated at a rate of at least 1,000 revolutions per minute. Preferably, both values are several times as high.

Figure 11:
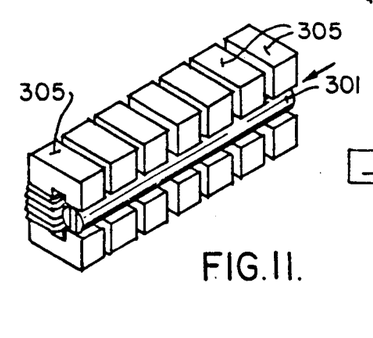
FIG. 11 is a view in perspective of another embodiment of device of the present invention, utilizing an electronically scanned magnetic field.
Figure 12:
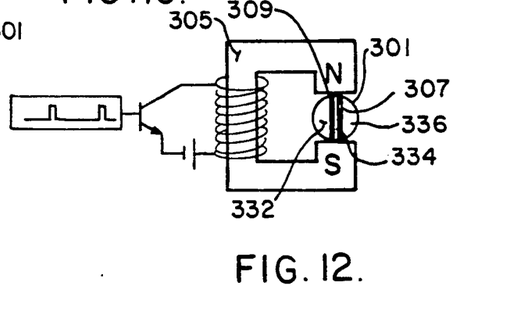
FIG. 12 is a view in end elevation of an outlet end of the device of FIG. 11.

As shown in FIGS. 11 and 12, to increase the velocity of the magnetic field with respect to the flowing water, it is also possible to provide a linear tube 301 having a series of electromagnets 305 arranged along its length. The electromagnets are activated in sequence to form, in effect, a linear motor, in accordance with well-known electronic control techniques. The sequential creation and collapse of the magnetic field produced by each electromagnet produces the equivalent of a moving magnetic field, thereby producing net movement of negatively charged particles. Two vertical baffles 307 and 309 divide the effluent into regions 332, 334, and 336 of decreasing contamination by negatively charged particles.

Numerous other variations in the device and method of the present invention, within the scope of the following claims, will occur to those skilled in the art.

I claim:

1. A method of further purifying ultra-pure, high resistivity water having a bulk resistivity of greater than 1.0 megohm-centimeter and containing trace amounts of organic and/or inorganic particles having an inherent negative charge theroen, said method being carried out without applying an external voltage to said particles to precharge said particles, said method comprising the steps of:

flowing in laminar fashion the water to be purified through an elongate chamber;

providing an electric or magnetic field in the chamber transverse to the direction of flow to cause the negatively charged particles to move in a predetermined direction transverse to the direction of flow;

separating the water in the chamber into a plurality of ones established according to the predetermined direction of negatively charged particle movement; and drawing further-purified water from a zone removed from the direction of negatively charged particle movement.

2. The method of claim 1 wherein the particles comprise live and dead bacteria and fragments thereof.

3. The method of claim 2 comprising a further step of deionizing the water to a level greater than four megohm centimeters prior to passing the water through said chamber.

4. The method of claim 1 wherein said electric or magnetic field is an electric field, said elongated chamber having an axially extending elongated cathode and an axially extending elongated anode laterally spaced from said cathode with respect to the direction of water flow through the chamber, said method comprising the step of applying a relative potential between said cathode and anode of about one thousand to five thousand volts.

5. The method of claim 4 wherein said chamber is generally cylindrical and one of said anode or cathode is an electrically conductive wall of the chamber and the otehr of the anode or cathode is an electrically conductive rod extending centrally within said chamber.

6. The method of claim 5 wherein the electrically conductive wall and the rod are coated with a dielectric material.

7. The method of claim 5 wherein said separating is accomplished by at least one annular baffle situated in said chamber coaxially around said rod proximate an outlet end of said chamber only, outlet means being provided from said chamber on each side of said baffle, said step of drawing further-purified water comprising drawing said further purified water from the cathode side of said baffle.

8. The method of claim 7 wherein said separating is accomplished by two annular baffles of differing diameter situated in said chamber coaxially around said rod proximate the outlet end of said chamber only, outlet means on both sides of said baffles being provided to retrieve three zones of outlet water of differing particle contamination, said step of drawing further-purified water comprising drawing said further purified water from the zone closest to said cathode.

9. The method of claim 7 wherein the cylindrical chamber includes first and second axial ends, a first end wall at said first axial end including a plurality of inlet openings, said method including causing said water to flow through said inlet openings in a laminar fashion.

10. The method of claim 9 wherein said outlet means comprise outlet openings in a second end wall at said second axial end.

11. The method of claim 1 wherein water is caused to flow through said chamber at a rate of at least 0.2 gallons per minute.

12. The method of claim 1 wherein said electric or magnetic field is magnetic.

13. The method of claim 12 wherein said method comprises a step of moving the magnetic field relative to said chamber.

14. The method of claim 13 wherein the magnetic field is produced by at least one permanent magnet, and wherein the chamber provides for flow along an arcuate path, said step of moving the magnetic field comprising rotating said permanent magnet with respect to said chamber along a path which is parallel to said arcuate path.

15. The method of claim 13 wherein said magnetic field is produced by a plurality of electromagnets, the step of moving the magnetic field comprising activating the electromagnets in a predetermined sequence.

16. The method of claim 1 wherein the step of drawing further-purified water comprises drawing the further-purified water from a zone farthest removed from the direction of negatively charged particle movement.

17. An apparatus for purifying ultra-pure water containing organic and/or inorganic particles cmprising:
water purification means for providing a source of ultra-pure water having a bulk resistivity of greater than 1.0 megohm-centimeter;
an elongated chamber having a generally cylindrical wall, a liquid inlet end and a liquid outlet end;
liquid inlet means through said liquid inlet end fluidly connected to the source of ultra-pure water produced by said water purification means;
an elongated rod axially disposed within said chamber and electrically insulated therefrom;
means for providing a D.C. electric potential between the wall of said chamber and said rod such that one of said wall or said rod acts as a cathode and the other acts as an anode;
at least one annular baffle positioned coaxially around said rod proximate said outlet end only and in fluid tight connection with said outlet end;
liquid outlet means through said chamber outlet end on both sides of said baffle such that fluid flowing through said chamber will be separated into zones and separately retrieved relative to the distance from the cathode and the zone on the side of said baffle nearest the cathode will provide purified liquid.

18. The apparatus of claim 17 wherein said chamber and the inlet to said chamber are sized, configured, and positioned to produce substantially laminar flow through said chamber and negligible pressure drop between said inlet and outlet sides of said chamber given the liquid flow rate.

19. The apparatus of claim 17 wherein said wall of said chamber acts as the cathode and said rod acts as the anode to enhance removal of particles in the liquid.

20. The apparatus of claim 17 including a purified water outlet attached to the zone on the side of said baffle nearest the cathode, and a recycle line connecting a zone on a side of the baffle away from the cathode with a point in the water purification means.

21. An apparatus for purifying ultra-pure water containing organic and/or inorganic particles comprising:
water purification means for providing a source of ultra-pure water having a bulk resistivity of greater than 1.0 megohm-centimeter;
a generally cylindrical elongated chamber having an axis, said chamber having a liquid inlet end wall generally perpendicular to said axis and a liquid outlet end wall generally perpendicular to said axis, inlet means in said liquid inlet rnf wall has been inserted after fluidly connected to the source of ultra-pure water produced by said water purification means, and outlet means in said outlet end wall, said inlet means and said outlet means being positioned to provide axial fulid flow through said chamber;
said inlet means comprising a plurality of liquid inlets to said chamber in said liquid inlet wall, the inlets and said chamber being sized, configured, and positioned to produce substantially laminar flow through said chamber and negligible pressure drop between said inlet and outlet sides of said chamber given the liquid flow rate;
either an electric field means or a magnetic field means for providing an electric or magnetic field in the chamber transverse to the direction of flow, said field causing negatively charged particles to move in a predetermined direction transverse to the direction of flow; and
baffle means proximate said outlet end wall only and in fluid tight connection with said outlet end wall for separating water streams carrying relatively less and relatively more of said negatively charged particles.

22. The apparatus of claim 21 wherein the electric field means or magnetic field means comprises means for producing an electrostatic field perpendicular to said axis.

23. The apparatus of claim 21 wherein the electric field means or magnetic field means comprises means for moving a magnetic field parallel to the axis in a direction opposite the direction of said axial fluid flow.

24. The apparatus of claim 21 including a purified water outlet attached to a water stream carrying the least of said negatively charged particles, and a recycle line connecting a stream carrying relatively more of said negatively charged particles with a point in the water purification means.

* * * * *